(12) United States Patent
Blivet et al.

(10) Patent No.: US 7,654,584 B2
(45) Date of Patent: Feb. 2, 2010

(54) GUIDE BUSHING EASILY INSERTED INTO A COUPLING BORE, AND A CORRESPONDING COUPLING

(75) Inventors: Philippe Blivet, Rennes (FR); Philippe Poder, Guichen (FR)

(73) Assignee: Legris SAS, Rennes (FR)

( * ) Notice: Subject to any disclaimer, the term of this patent is extended or adjusted under 35 U.S.C. 154(b) by 2 days.

(21) Appl. No.: 11/791,273

(22) PCT Filed: Nov. 23, 2005

(86) PCT No.: PCT/FR2005/002907

§ 371 (c)(1),
(2), (4) Date: May 22, 2007

(87) PCT Pub. No.: WO2006/058981

PCT Pub. Date: Jun. 8, 2006

(65) Prior Publication Data

US 2008/0028586 A1    Feb. 7, 2008

(30) Foreign Application Priority Data

Dec. 2, 2004   (FR)   ................................. 04 12783

(51) Int. Cl.
*F16L 21/06* (2006.01)
(52) U.S. Cl. ...................... 285/323; 285/305
(58) Field of Classification Search ................ 285/305, 285/307, 323, 324, 322, 345, 321
See application file for complete search history.

(56) References Cited

U.S. PATENT DOCUMENTS

| 5,205,594 | A  | * | 4/1993 | Stoll et al. | 285/322 |
| 5,230,539 | A  | * | 7/1993 | Olson | 285/323 |
| 5,895,078 | A  | * | 4/1999 | Le Clinche | 285/305 |
| 6,206,435 | B1 | * | 3/2001 | Le Clinche | 285/305 |
| 6,349,978 | B1 | * | 2/2002 | McFarland et al. | 285/322 |
| 6,866,304 | B2 | * | 3/2005 | Kaminski et al. | 285/319 |

FOREIGN PATENT DOCUMENTS

| FR | 2 511 115 | 2/1983 |
| FR | 2 789 147 | 8/2000 |
| FR | 2 792 702 | 10/2000 |

\* cited by examiner

*Primary Examiner*—David E Bochna
(74) *Attorney, Agent, or Firm*—Young & Thompson

(57) ABSTRACT

A guide bushing for guiding a tubular element in a bore of a coupling, the bushing being provided externally with retaining elements for retaining the bushing in the bore, and internally with guide shoes for guiding the tubular element inside the bushing, the retaining elements and the guide shoes being associated with portions of the bushing that are deformable between a first state in which the retaining elements are in an active position anchoring the bushing in the bore and in which the shoes define a section for passing the tubular element, and a second state in which the retaining elements are in inactive position set back from their active position and in which the guide shoes define a section that is smaller than the section for passing the tubular element. The invention also provides a corresponding coupling.

10 Claims, 2 Drawing Sheets

GUIDE BUSHING EASILY INSERTED INTO A COUPLING BORE, AND A CORRESPONDING COUPLING

The present invention relates to a guide bushing for guiding a tubular element in a coupling bore, and to a corresponding coupling.

BACKGROUND OF THE INVENTION

Such a coupling is usable in a fluid transport circuit for connecting together two circuit elements, i.e. a fluid emitter element and a fluid receiver element such as pipes, a pump, a tank, a manifold, an actuator, . . . .

In general, a coupling comprises a body defining a bore and connection means for holding therein, in leaktight manner, a tubular element such as an endpiece. Such connection means generally comprise a rigid tubular insert fitted with a deformable sealing element for providing sealing between the body and the endpiece, and a fastener member for holding the endpiece such as a radial latch or a washer with inwardly-directed teeth.

The tubular section is provided with guide portions for guiding the tubular element and defining a passage of section greater than the section of the endpiece.

The guidance achieved is relatively good but sometimes insufficient for avoiding ovalization of the endpiece or a small amount of off-centering thereof, which can run the risk of degrading the quality of contact between the sealing element and the endpiece.

In addition, inserting the insert into the bore commonly requires the use of a level of force that is relatively large so as to generate stresses both on the body of the coupling and on the insert. Removing the insert, e.g. for maintenance reasons, is also generally difficult, if not impossible without damaging the insert and/or the coupling.

OBJECT OF THE INVENTION

The invention relates to a guide bushing and to a coupling that do not present the above-mentioned drawbacks or at least that suffer from them to a lesser extent.

BRIEF DESCRIPTION OF THE INVENTION

To this end, the invention provides a guide bushing for guiding a tubular element in a bore of a coupling, the bushing being provided externally with retaining elements for retaining the bushing in the bore, and internally with guide shoes for guiding the tubular element inside the bushing. The retaining elements and the guide shoes are associated with portions of the bushing that are deformable between a first state in which the retaining elements are in an active position anchoring the bushing in the bore and in which the shoes define a section for passing the tubular element, and a second state in which the retaining elements are in inactive position set back from their active position and in which the guide shoes define a section that is smaller than the section for passing the tubular element.

Thus, when the bushing is in its second state, it can be inserted into the bore of the coupling using relatively little force. When the tubular element is inserted into the guide bushing, the guide bushing is in its first state so the retaining elements are in their anchor position and provide firm retention of the bushing in the bore. By providing a bearing surface for the guide shoes, the tubular element prevents the bushing from returning to its second state. In addition, the bushing can be arranged so that the guide shoes and the tubular element exert mutual contact pressure on one another that is taken up by the retaining elements and the wall of the bore which likewise exert mutual contact pressure on one another. The force exerted by the guide shoes on the tubular element enables the tubular element to be positioned and limits or even prevents ovalization thereof.

Preferably, the bushing is subdivided into first and second angular sectors, the first sectors being rigid and the second angular sectors being deformable, and each comprising both a central inwardly-directed curved indentation, provided internally with a guide shoe, and two ridges extending on either side of the central indentation to form the retaining elements.

The force exerted by the tubular element on the guide shoes thus tends to move the ridges away from one another, which ridges become pressed against the wall of the bore of the coupling and/or project into a groove therein. The presence of the angularly deformable sectors also imparts relative flexibility to the guide bushing, which can make it easier when inserting the bushing into the body of the coupling. This embodiment is particularly simple and effective.

The invention also provides a fluid coupling comprising a body defining a bore provided with connection means for connecting to a tubular element, the bore receiving a guide bushing that presents the above characteristics. The tubular element and the guide shoes have sliding surfaces for sliding mutually against one another, these surfaces being arranged to bring the deformable portions from their second states towards their first state during insertion of the tubular element in the bushing.

Thus, the bushing is moved from its second state towards its first state as a result of the co-operation between the sliding surfaces of the guide shoes and of the tubular element during insertion of the tubular element into the guide bushing. The bushing is thus moved from its second state towards its first state automatically, and does not require the operator to perform any operation other than inserting the tubular element into the bushing.

Other characteristics and advantages of the invention appear on reading the following description of a particular, non-limiting embodiment of the invention.

BRIEF DESCRIPTION OF THE DRAWINGS

Reference is made to the accompanying drawings, in which.

DETAILED DESCRIPTION OF THE INVENTION

Figure 1:
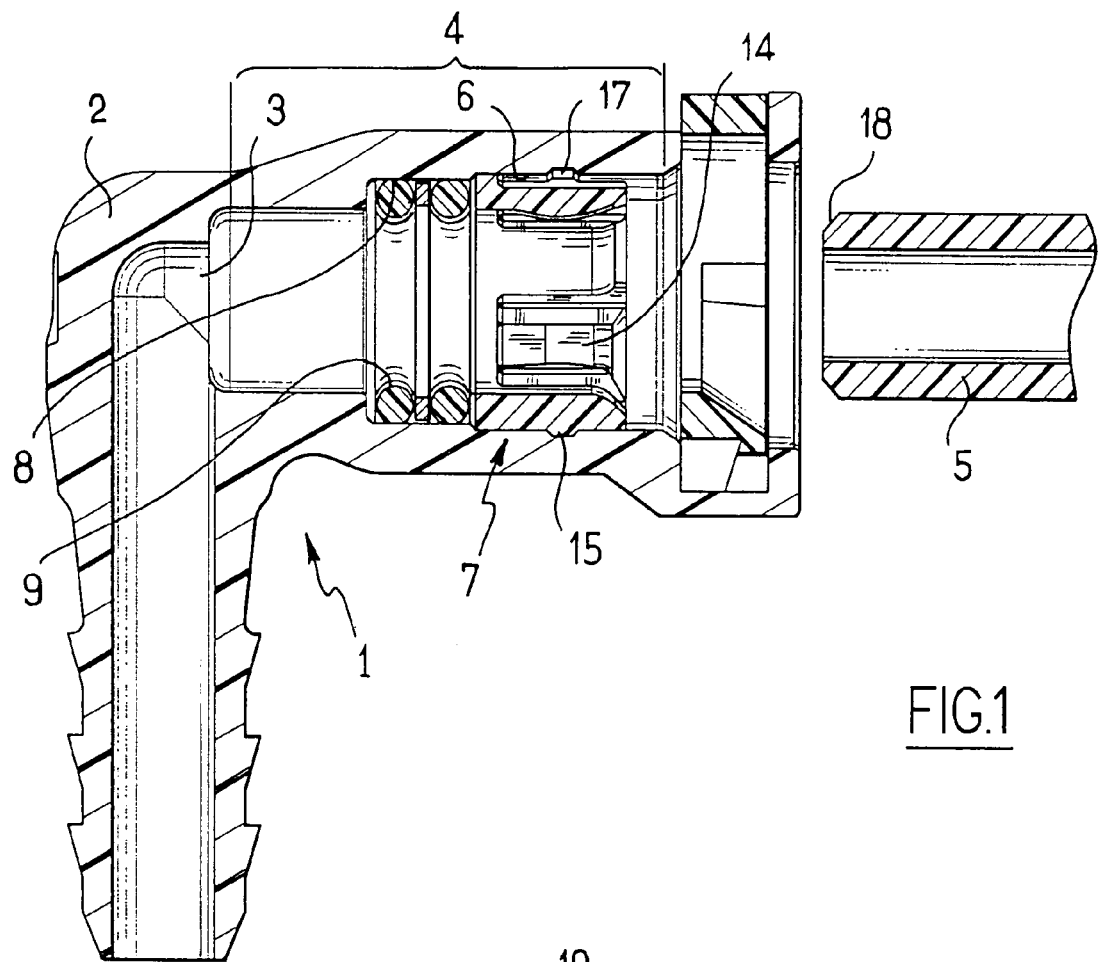
FIG. 1 is a longitudinal section view of a coupling in accordance with the invention.
Figure 2:
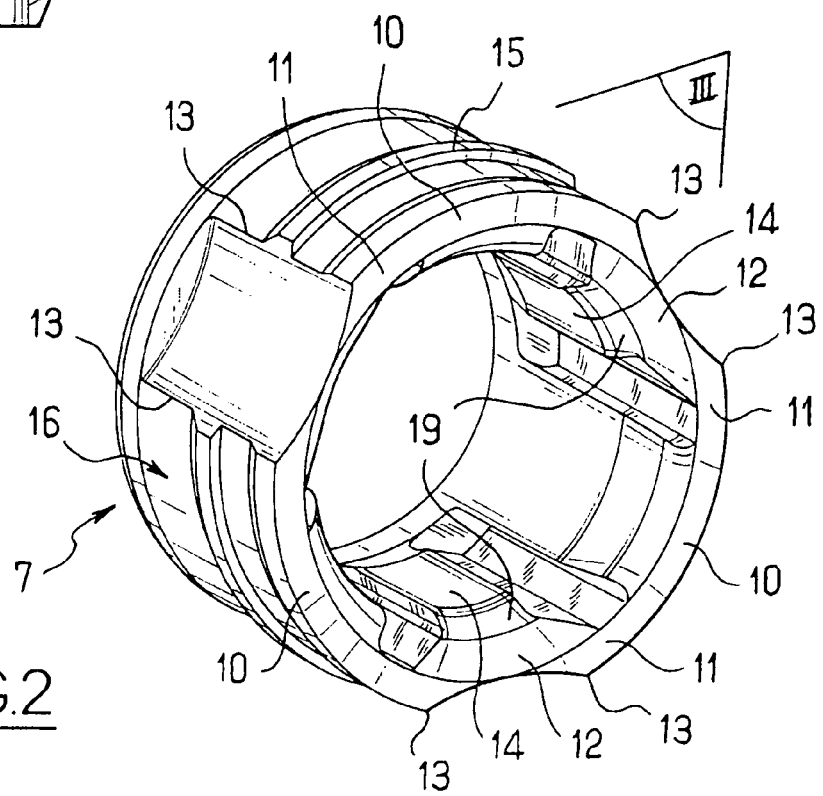
FIG. 2 is a perspective view of a guide bushing in accordance with the invention.

With reference to the figures, the coupling in accordance with the invention, given overall reference 1, comprises a tubular body 2, having a bend in the example shown, defining a bore 3 with one end 4 arranged to receive a tubular element 5 such as an endpiece or a pipe end.

The end 4 of the bore 3 is stepped and comprises a section 6 that receives a guide bushing given overall reference 7 and a section 8 that receives sealing elements 9 of conventional type.

The guide bushing 7 has an outside surface 16 presenting a diameter that is slightly less than the diameter of the section 6 of the bore 3. A collar 15 extends over the outside surface 16.

The outside diameter of the collar 15 is slightly less than the diameter in the bottom of a groove 17 formed in the section 6.

The guide bushing 7 is subdivided into alternating angular sectors 10 and 11.

The angular sectors 10 define an inside diameter that is slightly greater than the outside diameter of the tubular element 5 and they are of relatively great thickness, thereby making them relatively rigid.

Figure 3:
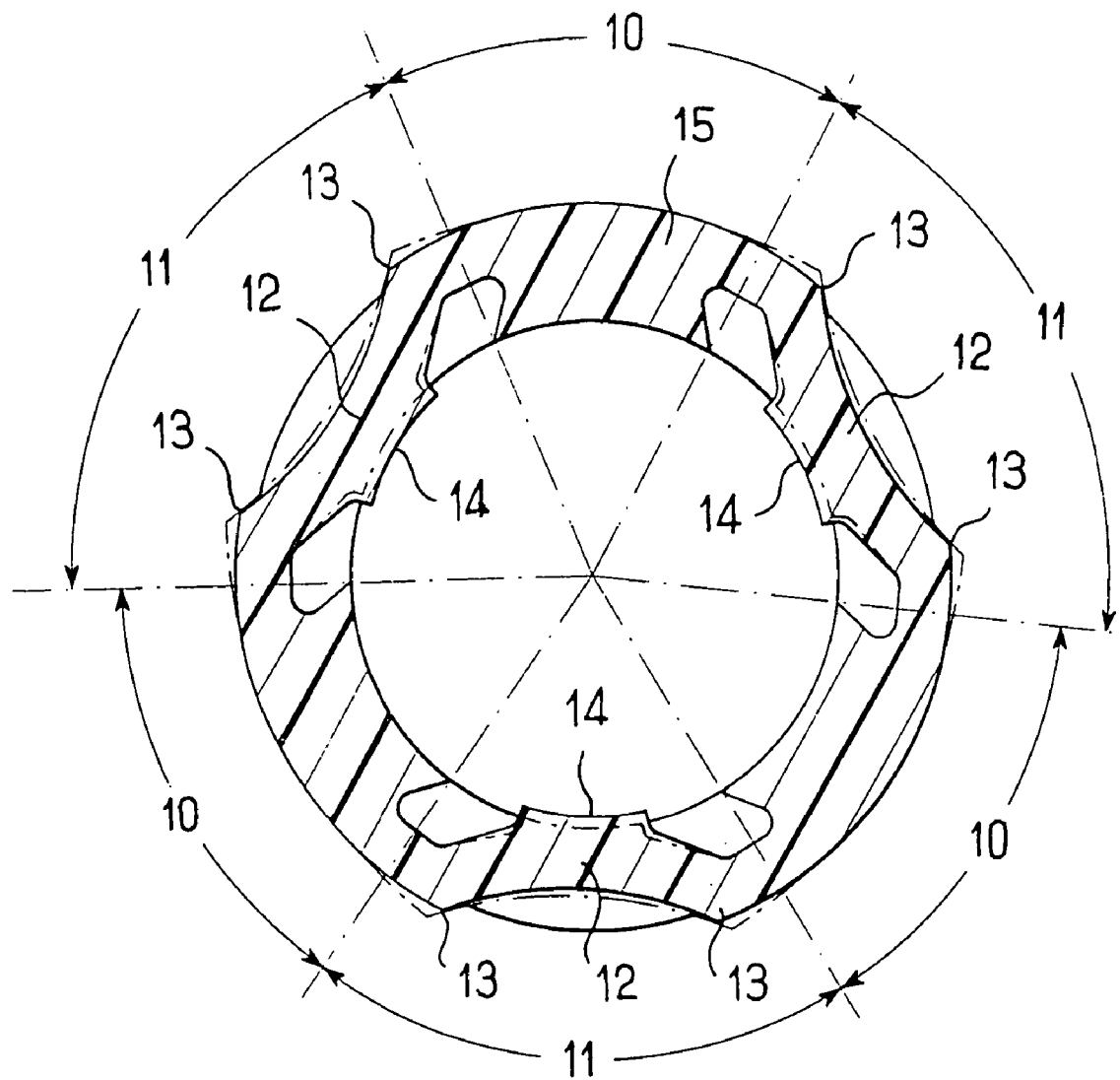
FIG. 3 is a cross-section on plane III of FIG. 2, showing the bushing of the invention in its first state and in its second state.

The angular sectors 11 present respective inwardly-directed curved indentations 12 between pairs of ridges 13 extending axially on either side of the central indentation 12. A guide shoe 14 is formed on the inside surface of the central indentation 12. The angular sectors 11 are of thickness smaller than that of the angular sectors 10 so as to be deformable. The angular sectors 11 thus form portions of the bushing 7 that are deformable between a first state, shown in chain-dotted lines in FIG. 3, and a second state shown in continuous lines in FIG. 3.

In the first state, the guide shoes 14 define a section for passing the tubular element 5, this through section having a diameter that is substantially equal to the outside diameter of the tubular element 5. In the second state, the guide shoes 14 define a section of diameter that is smaller than the outside diameter of the tubular element 5.

In the first state, the ridges 13, where they cross the collar 15, define a section of diameter greater than the outside diameter of the collar 15, and where they cross the outside surface 16, they define a section of diameter greater than the outside diameter of the guide bushing 7 (away from the collar). In the second state, the ridges 13, where they cross the collar 15, define a diameter that is substantially equal to the diameter of the collar, and where they cross the outside surface 16, they define a diameter that is substantially equal to the diameter of the guide bushing 7.

The coupling 1 also has connection means for holding the tubular element 5 in the coupling 1. These connection means are themselves known and in this example they comprise an annular latch mounted to move radially facing the end 4 of the bore 3. This annular latch has an internal projection designed to be received in a groove of the tubular element. Naturally, other connection means could be used, and in particular a fastening washer having an inside circumference subdivided into a plurality of teeth for biting into the surface of the tube.

The guide bushing 7 is inserted into the end 4 of the bore 3 while the bushing is in its second state. This insertion requires the use of force.

The collar 15 is received in the groove 17 and holds the guide bushing 7 in axial position. Nevertheless, it should be observed that the retention achieved in this way is not very strong so as to limit the force required for insertion. Nevertheless, the degree of retention achieved suffices for retaining the sealing elements 9 in position during manipulation of the coupling prior to being implanted in a fluid transport circuit.

When the tubular element 5 is inserted into the guide bushing 7, the externally chamfered surface 18 of the tubular element 5 encounters the sloping front surfaces 19 of the guide shoe 14 so that causing these surfaces to slide against one another brings the angular sectors 11 into their first state. The ridges 13 are then pressed firmly against the bottom of the groove 17 and against the wall of the section 6 of the bore 3, forming additional elements for retaining the guide bushing 7 in the bore 3. This contact pressure is exerted by the tubular element 5 via the guide shoe 14 and it opposes axial movement of the guide bushing. It should also be observed that using a collar 15 and a groove 17 is optional, providing the coefficient of friction of the bushing 7 against the wall of the bore 3 is sufficient to ensure that the bushing is held axially by friction.

When the tubular element 5 is withdrawn from the coupling, the angular sectors 11 of the guide bushing 7 return elastically to their second state.

Naturally, the invention is not limited to the embodiment described and variant embodiments can be applied thereto without going beyond the ambit of the invention as defined by the claims.

In particular, each guide shoe may be secured to the inside face of the free end of a deformable tab cut out in the bushing, with the corresponding retaining element being secured to the outside face of said free end.

The deformation of the angular sectors 11 may involve plastic deformation.

In addition, the numbers and the shapes of the angular sectors 10 and 11 could be different from those described.

The guide bushing could present external steps only along the ridges 13.

The invention claimed is:

1. A guide bushing for guiding a tubular element in a bore of a coupling, the bushing being provided externally with retaining elements for retaining the bushing in the bore, and internally with guide shoes for guiding the tubular element inside the bushing, wherein the retaining elements and the guide shoes are associated with deformable portions of the bushing, the deformable portions being deformable between a first state in which the retaining elements are in an active position for anchoring the bushing in the bore and in which the guide shoes define a first section configured to pass the tubular element, and a second state in which the retaining elements are in an inactive position set back from the active position and in which the guide shoes define a second section, smaller than the first section and configured to pass the tubular element, and wherein the bushing is subdivided into first and second angular sectors, the first angular sectors being rigid and the second angular sectors being deformable, and each of the first and second angular sectors comprising both a central inwardly directed curved indentation, provided internally with one of the guide shoes, and two ridges extending on either side of the curved indentation to form the retaining elements.

2. A fluid coupling, comprising:

a body, defining a bore and provided with connection means for connecting a tubular element, the bore configured to receive the guide bushing for guiding the tubular element in the bore, wherein the guide bushing is in accordance with claim 1, and wherein the guide shoes have sliding surfaces configured to slide mutually against an outer surface of the tubular element, said sliding surfaces being configured to move the deformable portions of the guide bushing from the second state towards the first state during insertion of the tubular element into the guide bushing as a result of a cooperation in sliding between both the sliding surfaces of the guide shoes and the outer surface of the tubular element.

3. The coupling according to claim 2, wherein the guide shoes have respective ramp-forming sliding surfaces.

4. The coupling according to claim 2, wherein the tubular element has a rampforming sliding surface.

5. The coupling according to claim 2,
wherein the guide shoes and the tubular element are configured, upon the tubular element being received in the bore, to exert mutual contact pressure on one another taken up by the retaining element, and
wherein a wall of the bore and the retaining element, upon the tubular element being received in the bore, are configured to exert mutual contact pressure on one another.

6. The bushing according to claim 1, wherein the bushing includes a collar projecting outwardly from the first and second angular sectors.

7. A fluid coupling, comprising:
a body, defining a bore and provided with connection means for connecting a tubular element; and
a guide bushing, comprising an external surface, an internal surface, external retaining elements provided on the external surface, internal guide shoes provided on the internal surface, and deformable portions in the cylindrical body,
wherein the deformable portions are deformable between a first state and a second state,
wherein the retaining elements and the guide shoes are associated with the deformable portions, such that
i) when the deformable portions are in the first state, the retaining elements assume an active position configured to anchor the bushing in the bore, and the shoes assume a first configuration defining a first cylindrical space having a first radius configured to pass the tubular element, and
ii) when the deformable portions are in the second state, the retaining elements assume an inactive position set back from the active position, and the shoes assume a second configuration defining a second cylindrical space having a second radius smaller than the first radius,
wherein the bore is configured to receive the guide bushing for guiding the tubular element in the bore,
wherein the guide shoes have sliding surfaces configured to slide mutually against an outer surface of the tubular element, said sliding surfaces being arranged to move the deformable portions of the guide bushing from the second state towards the first state during insertion of the tubular element into the guide bushing, and
wherein the bushing is subdivided into first and second angular sectors, the first angular sectors being rigid and the second angular sectors being deformable, and each of the first and second angular sectors comprising both a central inwardly directed curved indentation, provided internally with one of the guide shoes, and two ridges extending on either side of the curved indentation to form the retaining elements.

8. The coupling according to claim 7, wherein the guide shoes have respective ramp-forming sliding surfaces.

9. The coupling according to claim 7, wherein the tubular element has a ramp-forming sliding surface.

10. The coupling according to claim 7,
wherein the guide shoes and the tubular element are configured, upon the tubular element being received in the bore, to exert mutual contact pressure on one another taken up by the retaining element, and
wherein a wall of the bore and the retaining element, upon the tubular element being received in the bore, are configured to exert mutual contact pressure on one another.

* * * * *